(12) United States Patent
Draghetti et al.

(10) Patent No.: US 7,530,444 B2
(45) Date of Patent: May 12, 2009

(54) TRANSFER UNIT FOR TRANSFERRING ELONGATED ARTICLES

(75) Inventors: Fiorenzo Draghetti, Medicina (IT); Salvatore Rizzoli, Bologna (IT)

(73) Assignee: G.D Societa' per Azioni, Bologna (IT)

( * ) Notice: Subject to any disclaimer, the term of this patent is extended or adjusted under 35 U.S.C. 154(b) by 779 days.

(21) Appl. No.: 11/110,991

(22) Filed: Apr. 15, 2005

(65) Prior Publication Data
US 2005/0236256 A1 Oct. 27, 2005

(30) Foreign Application Priority Data
Apr. 22, 2004 (IT) .......................... BO2004A0239

(51) Int. Cl.
*B65G 47/84* (2006.01)
(52) U.S. Cl. ............... 198/474.1; 198/476.1; 198/475.1
(58) Field of Classification Search ............. 198/474.1, 198/476.1, 441, 461.1, 471.1, 475.1
See application file for complete search history.

(56) References Cited

U.S. PATENT DOCUMENTS

| | | | | |
|---|---|---|---|---|
| 2,944,654 A | * | 7/1960 | Schubert ................ | 198/377.02 |
| 3,010,561 A | | 11/1961 | Ricke | |
| 3,164,243 A | * | 1/1965 | Schubert et al. ............. | 198/450 |
| 5,769,205 A | * | 6/1998 | Belvederi et al. ......... | 198/475.1 |
| 6,015,040 A | * | 1/2000 | Goeb et al. .................. | 198/438 |
| 6,736,257 B2 | * | 5/2004 | Steiniger et al. ......... | 198/461.1 |
| 2003/0051978 A1 | | 3/2003 | Steiniger et al. | |

FOREIGN PATENT DOCUMENTS

| | | |
|---|---|---|
| DE | 102 34 374 | 2/2004 |
| EP | 1 108 369 | 6/2001 |
| EP | 1 287 753 | 3/2003 |

OTHER PUBLICATIONS

English Abstract of EP 1 287 753 dated Mar. 5, 2003.
English Abstract of DE 102 34 374 dated Feb. 5, 2004.

* cited by examiner

*Primary Examiner*—James R Bidwell
(74) *Attorney, Agent, or Firm*—Ladas and Parry LLP

(57) ABSTRACT

A transfer unit for transferring elongated articles, wherein a uniform succession of articles is fed by an input drum to a first transfer station, where the articles are picked up successively by a number of pickup heads of a transfer drum for supply, through a second transfer station, to an output drum in a uniform succession of pairs of side by side articles; some of the pickup heads are fixed, and some oscillate with respect to the transfer drum; the fixed pickup heads alternate with the oscillating pickup heads; and each oscillating pickup head oscillates to and from a position contiguous to one of the two adjacent fixed pickup heads.

4 Claims, 2 Drawing Sheets

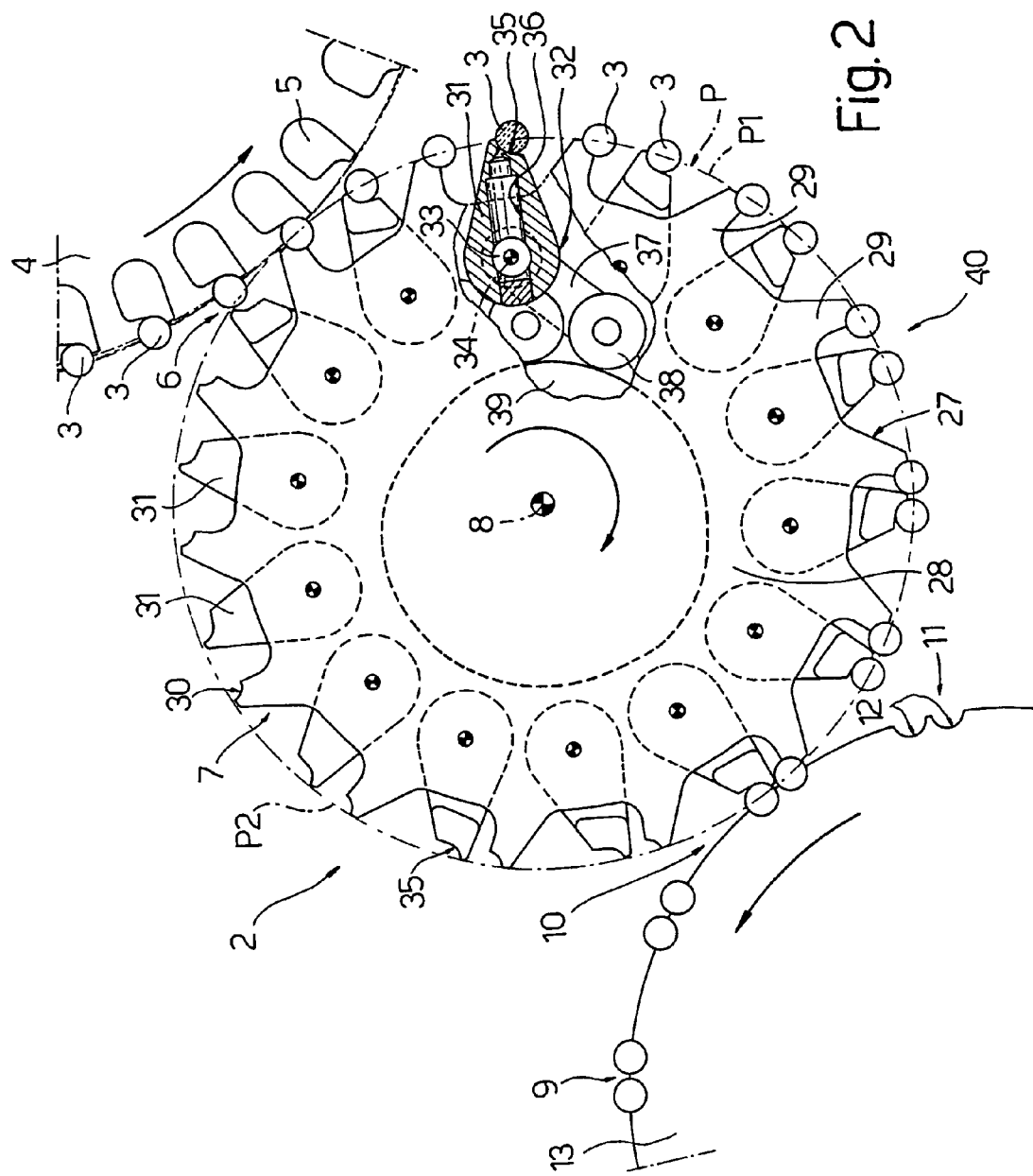

TRANSFER UNIT FOR TRANSFERRING ELONGATED ARTICLES

The present invention relates to a transfer unit for transferring elongated articles.

Though suitable for transferring any elongated article, the present invention may be used to advantage in the tobacco industry for transferring double cigarette portions along an input unit of a filter assembly machine, to which the following description refers purely by way of example.

BACKGROUND OF THE INVENTION

In a filter assembly machine, the advantages of feeding a succession of pairs of side by side double cigarette portions to a rolling drum of the filter assembly machine are known, for example, from EP-B-110836.

As described in the above patent, the succession of pairs of side by side double cigarette portions is formed by feeding the double cigarette portions along a transfer unit located at the input of the filter assembly machine and comprising two feed lines, each of which feeds a respective single succession of double cigarette portions to specific points on an output drum located upstream from a rolling drum of the filter assembly machine.

SUMMARY OF THE INVENTION

It is an object of the present invention to provide a transfer unit for transferring elongated articles, designed to produce a uniform succession of pairs of side by side elongated articles at the output of the transfer unit using only one feed line for the elongated articles.

According to the present invention, there is provided a transfer unit for transferring elongated articles, as claimed in the attached claims.

BRIEF DESCRIPTION OF THE DRAWINGS

A non-limiting embodiment of the present invention will be described by way of example with reference to the accompanying drawings, in which:

FIG. 2 shows a larger-scale, partly sectioned view of a detail in FIG. 1.

DETAILED DESCRIPTION OF THE INVENTION

Figure 1:
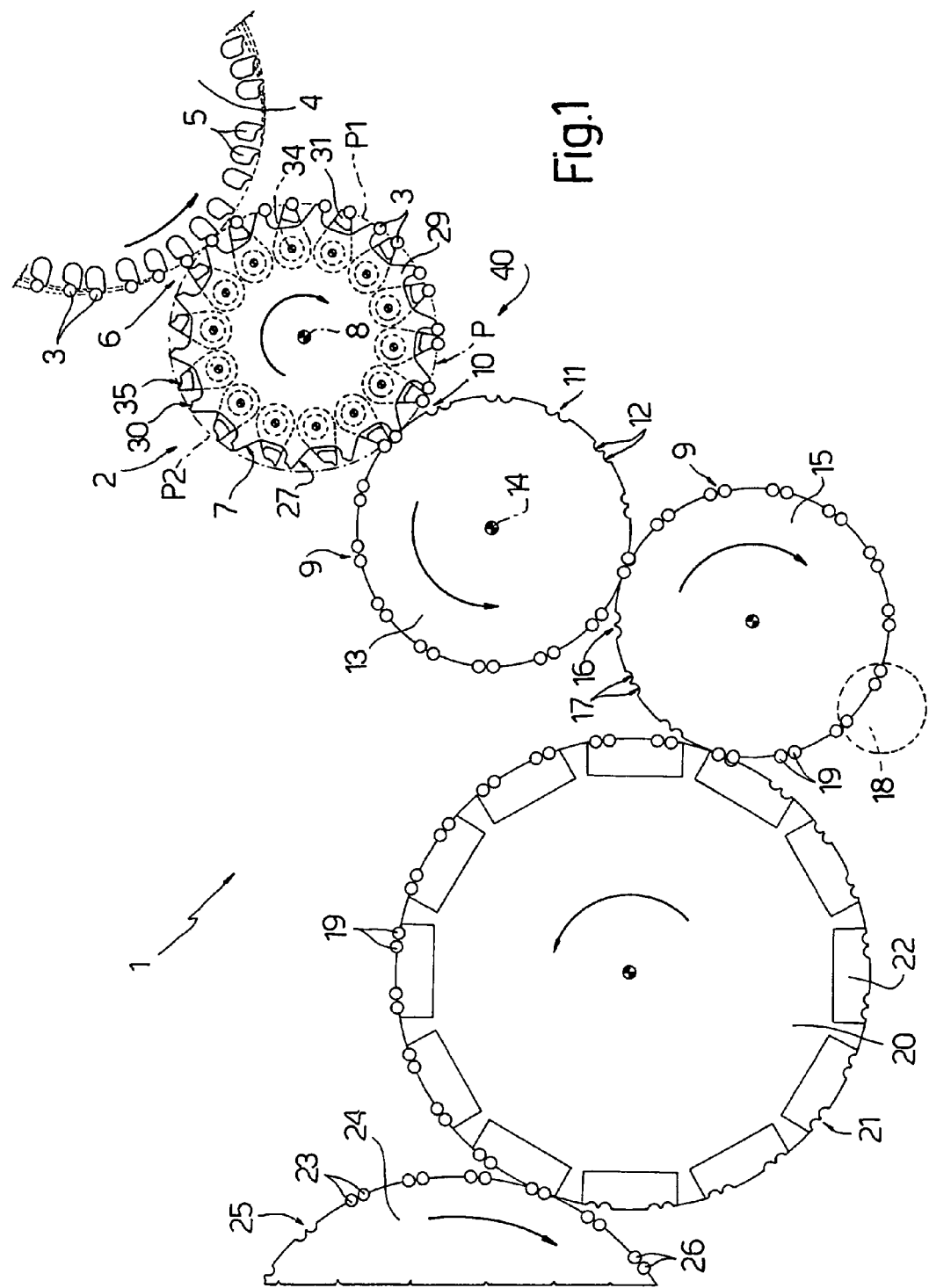
FIG. 1 shows a partial schematic side view of an input portion of a filter assembly machine comprising the transfer unit according to the present invention.

Number 1 in FIG. 1 indicates as a whole a filter assembly machine, an input portion of which comprises a transfer unit 2 for transferring double cigarette portions 3, i.e. portions twice the length of a portion which, joined to a respective filter, forms a normal cigarette. Transfer unit 2 comprises a known input drum 4 connected, e.g. by a known spider-type transfer device (not shown), to an output of a cigarette manufacturing machine (not shown), e.g. a multiple-rod machine for producing two or more parallel cigarette rods.

Input drum 4 comprises a number of pickup heads 5 for receiving and feeding respective double cigarette portions 3 in a uniform succession to a transfer station 6, where input drum 4 is tangent to a transfer drum 7, which forms part of transfer unit 2, is mounted to rotate, clockwise in FIG. 1, about an axis 8 perpendicular to the FIG. 1 plane, converts the uniform succession of double cigarette portions 3 received from input drum 4 into a uniform succession of pairs 9 of side by side double cigarette portions 3, and feeds pairs 9, at a transfer station 10, into respective pairs 11 of side by side seats 12 on an output drum 13 also forming part of transfer unit 2.

Output drum 13 is mounted to rotate, anticlockwise in FIG. 1, about an axis 14 parallel to axis 8, and pairs 11 of seats 12 are spaced about the periphery of output drum 13 with a spacing which is roughly twice the spacing of pickup heads 5 of input drum 4 at transfer station 6.

Downstream from transfer unit 2, the resulting pairs 9 of double cigarette portions 3 are transferred to a further drum 15, which is tangent to output drum 13, comprises pairs 16 of seats 17 with the same spacing as pairs 11 on output drum 13, and feeds double cigarette portions 3 through a known cutting device 18, which cuts each double cigarette portion 3 transversely in half to form, in each seat 17, a respective pair of coaxial single cigarette portions 19.

Downstream from cutting device 18, drum 15 is tangent to a known parting drum 20 comprising pairs 21 of seats with the same spacing as pairs 16 on drum 15, and a number of known movable assemblies 22 which, as parting drum 20 rotates, axially part the single cigarette portions 19 in each pair of single cigarette portions 19 by a distance approximately equal to but no smaller than the length of a double filter 23. Parting drum 20 is also tangent to a further drum 24, which in turn comprises pairs 25 of seats having the same spacing as pairs 21 on parting drum 20 and comprising respective adjacent seats, each of which receives a respective double filter 23 (in known manner not shown) upstream from the point of tangency between parting drum 20 and drum 24, and a respective pair of single cigarette portions 19 at said point of tangency, to form a respective group 26 comprising two coaxial single cigarette portions 19 separated by a double filter 23.

Transfer drum 7 of transfer unit 2 comprises a ring 27 coaxial with axis 8 and in turn comprising a hub 28, and a number of known fixed pickup heads 29, which project radially outwards of hub 28, are equally spaced about the periphery of hub 28 with the same spacing as pairs 11 on output drum 13, are fixed with respect to hub 28, and rotate with hub 28 about axis 8. The outer ends of pickup heads 29 define respective suction seats 30, each for housing a respective double cigarette portion 3, and each of which travels along an annular path P coaxial with axis 8 and comprising a work portion P1 extending, in the rotation direction of ring 27, between transfer station 6 and transfer station 10, and a return portion P2 extending between transfer station 10 and transfer station 6.

As shown more clearly in FIG. 2, transfer drum 7 comprises a number of pickup heads 31, each of which is interposed between two consecutive pickup heads 29, and is defined by one arm of a respective rocker arm 32 hinged to hub 28 by a pin 33 fitted in rotary manner through hub 28 to oscillate about a respective axis 34 parallel to axis 8.

The free end of each pickup head 31 has a suction seat 35, which is similar to seats 30, houses a respective double cigarette portion 3, and communicates with a respective suction conduit 36.

Each rocker arm 32 comprises a further arm 37 fitted to respective pin 33 and fitted on its own free end with a cam follower 38 maintained contacting a fixed cam 39 extending about axis 8.

As ring 27 rotates about axis 8, each pickup head 31 is thus moved along path P and also oscillated about respective axis 34; and cam 39 is designed so that each pickup head 31, as it travels through transfer station 6, is positioned centrally with respect to the adjacent seats 30 to receive a respective double cigarette portion 3 from the uniform succession fed through transfer station 6 by input drum 4, and, as it travels through transfer station 10, is positioned contiguous to one of the two adjacent seats 30—in the example shown, the seat 30 following seat 35 in the rotation direction of ring 27 about axis 8—to release the resulting pair 9 of double cigarette portions 3 to a respective pair 11 of seats 12 at transfer station 10.

In the case of transfer unit 2, one feed line 40, defined by input drum 4, transfer drum 7, and output drum 13, is therefore sufficient to convert the uniform succession of double cigarette portions 3 supplied by input drum 4 into a uniform succession of pairs 9 supplied to output drum 13.

The invention claimed is:

1. A transfer unit for transferring elongated articles, the unit (2) comprising a first, a second, and a third rotary drum (4, 7, 13), the second drum (7) being tangent to the first and to the third drum (4, 13) at a first and a second transfer station (6, 10) respectively;

the first drum (4) having a number of peripheral first seats (5) equally spaced with a first spacing at the first transfer station (6) and for feeding a uniform succession of elongated articles (3) to the first transfer station (6);

the third drum (13) having a number of first pairs (11) of contiguous peripheral second seats (12), said first pairs (11) being spaced with a second spacing equal to twice said first spacing;

the second drum (7) comprising a number of pickup heads (29, 31) having respective peripheral third seats (30, 35) for respective elongated articles (3);

said number of pickup heads (29, 31) comprises first pickup heads (29) integral with the second drum (7) and spaced about the second drum (7) with said second spacing, second pickup heads (31) alternating with the first pickup heads (29) and movable with respect to the first pickup heads (29), and said number of pickup heads (29, 31) further comprises actuating means (38, 39) connected to each second pickup head (31) to move the second pickup head (31) between the two first pickup heads (29) adjacent to it, so that the relative third seat (35) assumes a centred position centred with respect to the third seats (30) of the adjacent said two first pickup heads (29) at the first transfer station (6), and a contiguous position contiguous to the third seat (30) of one of the adjacent said two first pickup heads (29) at the second transfer station (10), to form a second pair of side by side third seats (30, 35).

2. A unit as claimed in claim 1, wherein the second drum (7) has a first axis (8), and is mounted to rotate, with the first and second pickup heads (29, 31) about the first axis (8); and each second pickup head (31) is mounted to oscillate, under control of the actuating means (38, 39), about a respective second axis (34) parallel to the first axis (8), to set the relative third seat (35) to said centred position and said contiguous position.

3. A unit as claimed in claim 1, wherein said actuating means (38, 39) are cam actuating means.

4. A unit as claimed in claim 1, wherein said actuating means (38, 39) comprise a fixed central cam (39), and, for each said second pickup head (31), a cam follower (38) fitted to the second pickup head (31).

\* \* \* \* \*